(12) United States Patent
Bhella et al.

(10) Patent No.: US 7,438,217 B2
(45) Date of Patent: Oct. 21, 2008

(54) SYSTEM AND METHOD FOR CONFIGURING A COMPUTING DEVICE

(75) Inventors: Ken Bhella, Stony Brook, NY (US); Edwin Booth, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 41 days.

(21) Appl. No.: 11/396,133

(22) Filed: Mar. 31, 2006

(65) Prior Publication Data

US 2007/0228137 A1 Oct. 4, 2007

(51) Int. Cl.
G06F 17/00 (2006.01)
G06F 3/00 (2006.01)

(52) U.S. Cl. .......................... 235/375; 710/8
(58) Field of Classification Search .......... 235/375, 235/462.15; 710/104, 8; 726/1
See application file for complete search history.

(56) References Cited

U.S. PATENT DOCUMENTS 5,784,177 A * 7/1998 Sanchez et al. ............. 358/468
7,093,760 B1 * 8/2006 Collins, Jr. ............. 235/462.01
2003/0055919 A1 * 3/2003 Fong et al .................... 709/220
2003/0090517 A1 * 5/2003 Anderson et al. ........... 345/747
2004/0128389 A1 * 7/2004 Kopchik, Kurt ............. 709/228
2004/0164156 A1 * 8/2004 Watanabe et al. ....... 235/462.15
2004/0239676 A1 * 12/2004 Yoo ........................... 345/501

* cited by examiner

*Primary Examiner*—Daniel A Hess
(74) *Attorney, Agent, or Firm*—Fay Kaplun & Marcin, LLP

(57) ABSTRACT

Described is a system and method for configuring a computing device. The method comprises detecting a coupling of a computing device to a host device, receiving first configuration data from the computing device, displaying the first configuration data on a graphical user interface on a display of the host device, generating second configuration data as a function of at least one change to the first configuration data entered via the graphical user interface and inputting the second configuration data to the computing device so that the computing device replaces the first configuration data with the second configuration data.

23 Claims, 9 Drawing Sheets

FIG. 7

SYSTEM AND METHOD FOR CONFIGURING A COMPUTING DEVICE

FIELD OF THE INVENTION

The present invention relates generally to systems and methods for configuring computing devices.

BACKGROUND

Software applications (e.g., configuration utilities) have been developed for allowing users of computing devices to update software, reconfigure settings and/or extend functionality of the computing devices. However, most users are not well versed in low-level operation of the computing devices and have difficulty effecting such changes. Employers are reluctant to allocate resources for training the users in the low-level operation and/or employing a separate IT team to perform these relatively menial tasks. Thus, there exists a need for allowing untrained personnel to reconfigure the computing device.

SUMMARY OF THE INVENTION

The present invention relates to a system and method for configuring a computing device. The method comprises detecting a coupling of a computing device to a host device, receiving first configuration data from the computing device, displaying the first configuration data on a graphical user interface on a display of the host device, generating second configuration data as a function of at least one change to the first configuration data entered via the graphical user interface and inputting the second configuration data to the computing device so that the computing device replaces the first configuration data with the second configuration data.

DESCRIPTION OF THE DRAWINGS

FIG. 7 shows an exemplary embodiment of a bar code recognition screen of a user interface according to the present invention.

DETAILED DESCRIPTION

Figure 1:
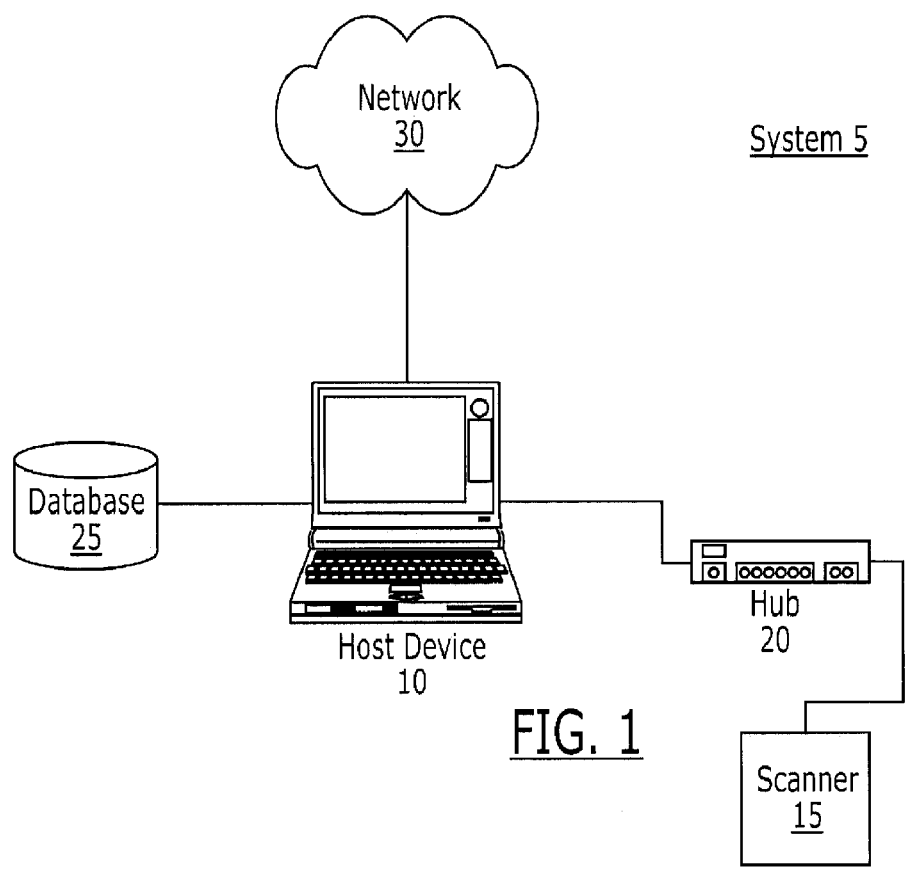
FIG. 1 shows an exemplary embodiment of a system for configuring a computing device according to the present invention.

The present invention may be further understood with reference to the following description and the appended drawings, wherein like elements are referred to with the same reference numerals. The present invention describes a system and method for configuring a computing device. The exemplary embodiments of the present invention will be described with reference to configuring one or more imager-/laser-based scanners. However, those of skill in the art will understand that the present invention may also be utilized to configure other computing devices including, but not limited to, RFID readers/tags, mobile phones, PDAs, tablets, network interface cards, laptops, digital cameras, portable media players, etc.

FIG. 1 shows an exemplary system 5 for configuring a computing device according to the present invention. The system 5 includes a host device 10 (e.g., PC, laptop, etc.) coupled to one or more computing devices (e.g., a scanner 15) via a hub 20. Those of skill in the art will understand that the scanner 15 may be connected directly to the host device 10 when the host device 10 has connectors (e.g., serial, USB, etc.) for receiving and communicating with the scanner 15. While the exemplary embodiments will be described with reference to configuration of the single scanner 15, those of skill in the art will understand that the hub 20 may allow a plurality of scanners 15 to communicate with and be configured by the host device 10 simultaneously. The hub 20 may utilize hard ports (e.g., serial, USB, Ethernet) and/or soft ports (e.g., radio frequency, infrared) for transferring data to/from the scanner 15 and the host device 10. Although the exemplary embodiments describe the scanner 15 being coupled to the host device 10, in other exemplary embodiments, the scanner 15 may be configured without being coupled to the host device 10, as will be explained further below.

In the exemplary embodiments, the host device 10 executes a software application (e.g., a configuration utility) which allows a user of the host device 10 to reconfigure, program, update, etc. software, settings and/or functionality of the scanner 15. That is, a manufacturer may provide the scanner 15 to the user with a predetermined software library, preconfigured settings and limited functionality. For example, the scanner 15 may only support scanning of only a particular symbology. However, the user may desire to reconfigure the scanners 15 based on, for example, intended operations (e.g., other symbologies), errors, bugs, malfunctions, etc. The configuration utility provides an easily navigable user interface (UI), allowing the user to reconfigure the scanner(s) 15 using the host device 10. As will be described further below, the host device 10 may be coupled to (or integral with) a database 25 for storing information related to the scanner 15 and may have access to a communications network 30 (e.g., the Internet, an intranet, wired/wireless LAN/WAN, etc.).

Figure 2:
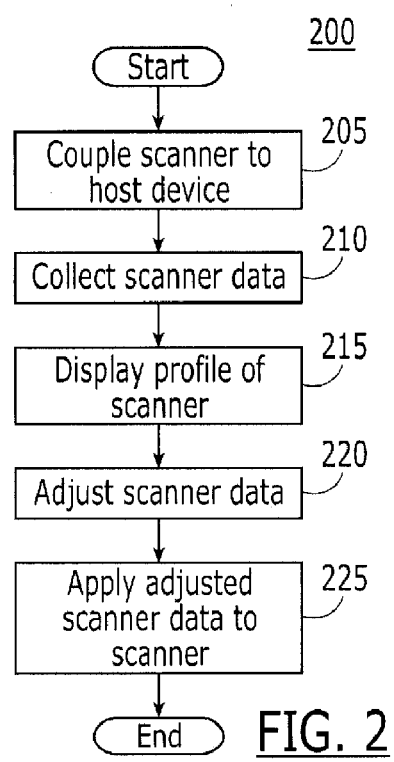
FIG. 2 shows an exemplary embodiment of a method for configuring a computing device according to the present invention.

FIG. 2 shows an exemplary embodiment of a method 200 for configuring the scanner 15 according to the present invention. In step 205, the scanner 15 is coupled to the host device 10, either directly or via the hub 20. As noted above, a plurality of scanners (of the same or varying types) may interface with the host device 10 via the hub 20. In addition, other devices which are different from the scanner 15 may be connected to the hub 20 and configured by the host device 10 in parallel with the scanner 15. For example, the scanner 15 and a PDA may be coupled to the hub 20 and configured by the host device 10 simultaneously. This may be beneficial when, for example, the scanner 15 and the PDA have similar functionality (e.g., wireless communications, bar code imaging/scanning, etc.).

Figure 3:
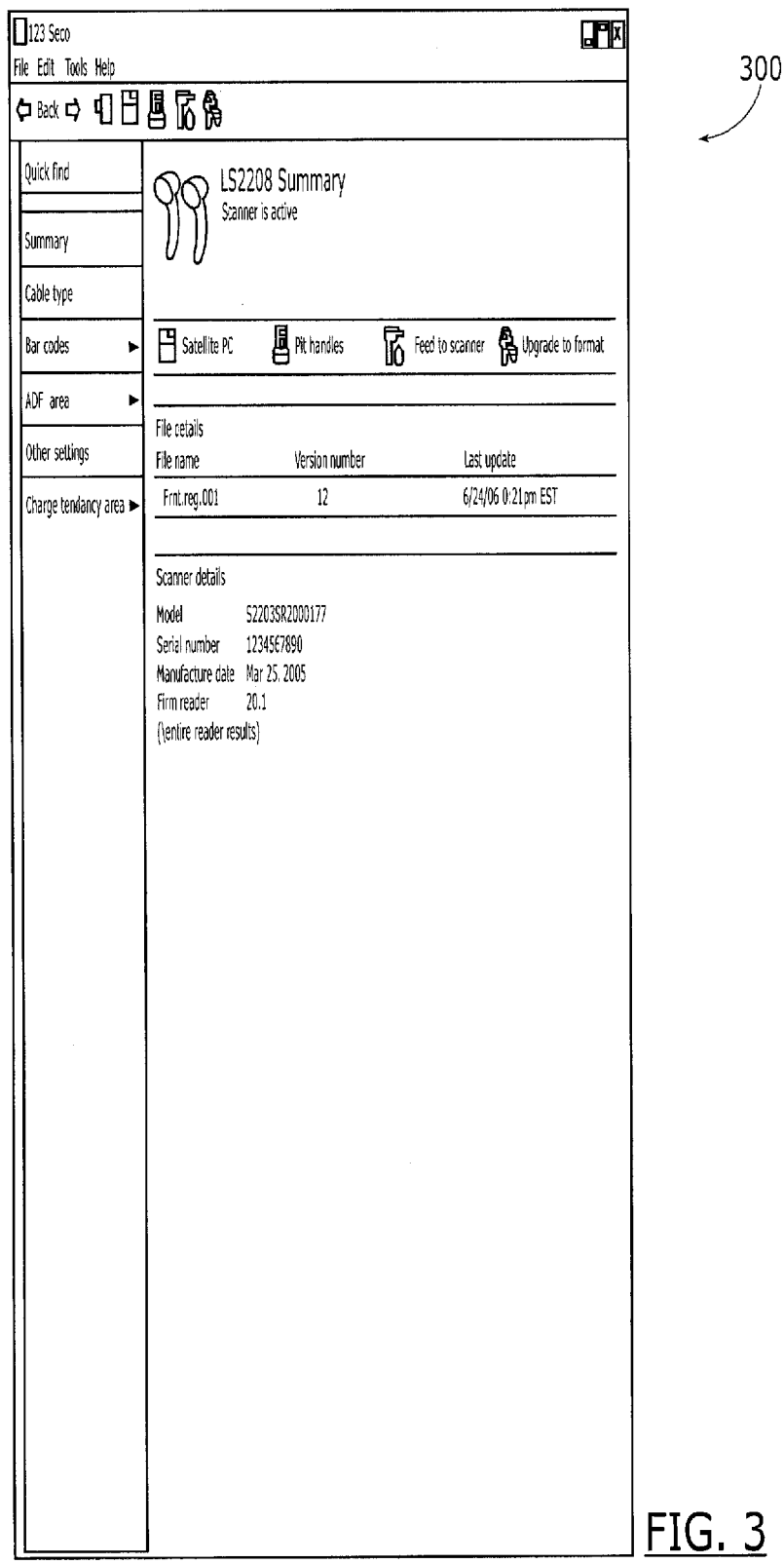
FIG. 3 shows an exemplary embodiment of a table including a profile of a computing device according to the present invention.

In step 210, the host device 10 collects scanner data from the scanner 15. The scanner data may include, for example, a scanner model, a serial number, a configuration file name, a firmware version, a manufacture date, a communication protocol, etc. In step 215, the scanner data from the scanner 15 (and any other scanner coupled to the host device 10) may be displayed on the host device 10 as a profile in a summary 300, an exemplary embodiment of which is shown in FIG. 3. The summary 300 may include further profiles when other scanners (or other devices) are coupled to the host device 10, allowing the user to confirm visually settings of the scanners and reconfigure a plurality of scanners simultaneously.

Figure 5:
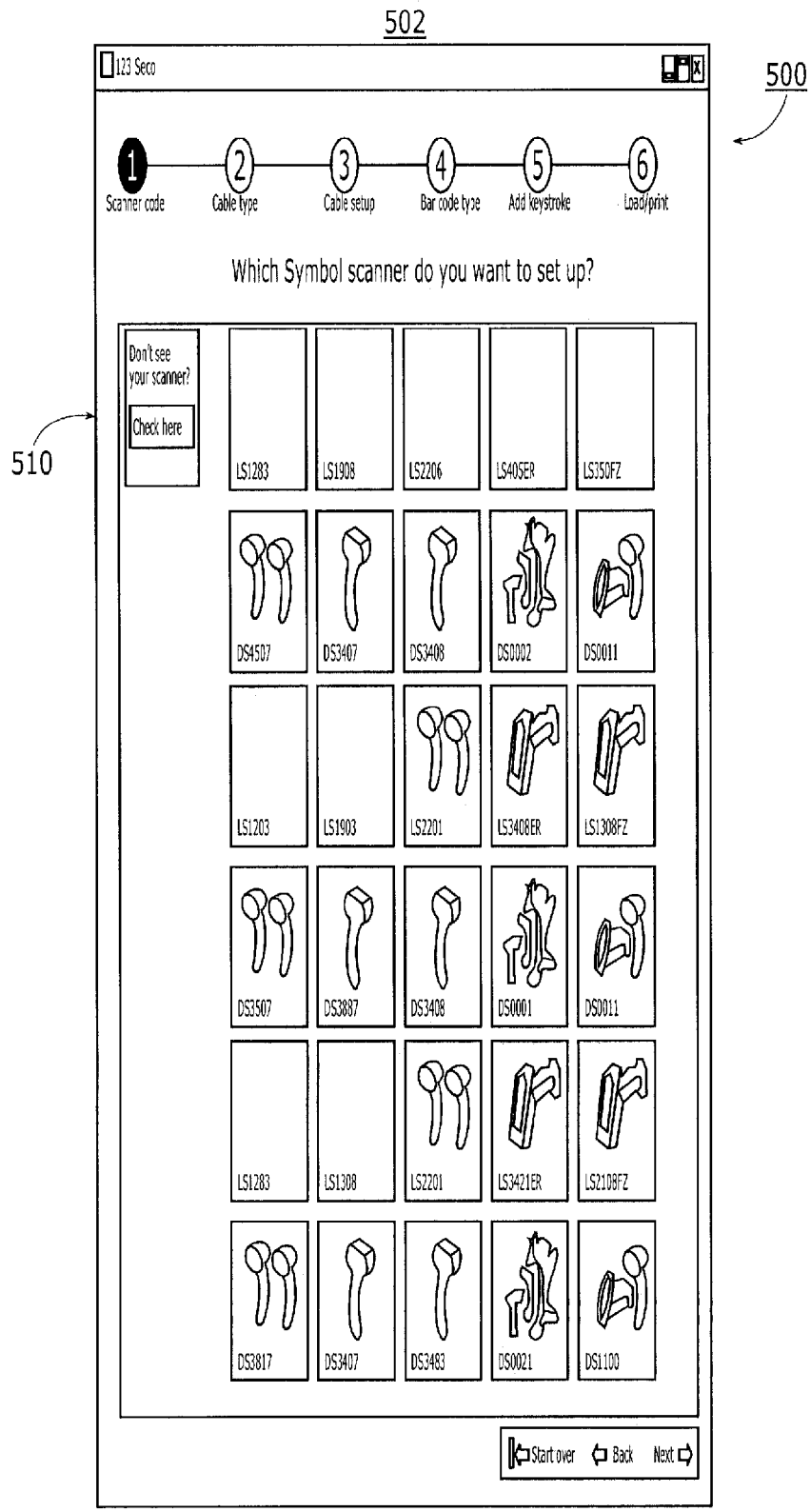
FIG. 5 shows an exemplary embodiment of a scanner identification screen of a user interface according to the present invention.

In another exemplary embodiment of the present invention, the scanner 15 need not be coupled to the host device 10 for the user to reconfigure the scanner 15. For example, when the user loads the configuration utility on the host device 10, it may ask the user whether to proceed without coupling the scanner 15. If the scanner 15 is then coupled to the host device 10, the scanner data is collected, as described above. If the user proceeds without coupling the scanner 15, the configuration utility gathers input from the user regarding the scanner 15. For example, FIG. 5 shows an exemplary embodiment of a scanner identification screen 502 of a user interface (UI) 500 providing a plurality of pictures 505 of scanners to the user so that the scanner 15 may be easily identified. The UI 500 may further provide a look-up option 510 if the scanner 15 is not shown in the pictures 505. If the look-up option 510 is activated, the host device 10 may retrieve one or more further pictures over the network 30. For example, if the scanner 15 was a ring scanner, the look-up option 510 may be utilized.

Figure 6:
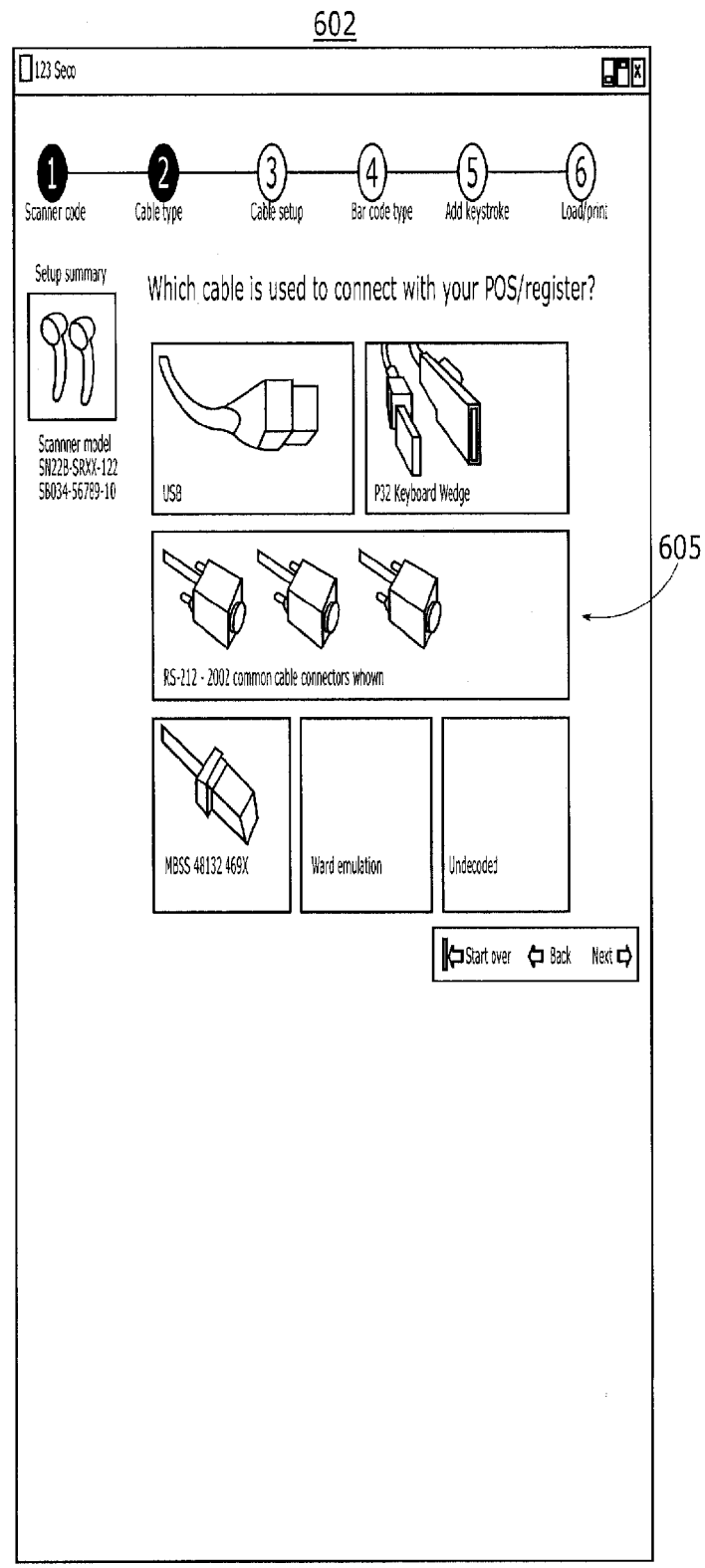
FIG. 6 shows an exemplary embodiment of a communication protocol identification screen of a user interface according to the present invention.

After the user has identified the picture of the scanner 15, a communication protocol identification screen 602 may be presented on the UI 500, as shown in FIG. 6. The screen 602 may present a plurality of pictures 605 of cables corresponding to protocols used by different scanners. The protocols may include, but are not limited to, USB, PS/2 Keyboard wedge, RS-232, IBM 468X/469X, wand emulation, undecoded, etc. Using the pictures 605 of the cables, the communication protocol of the scanner 15 may be determined even if the user has no knowledge of communication protocols. FIG. 6 also shows a configuration summary 610 displaying previously items selected by the user while stepping through the UI 500. The configuration summary 610 may be updated as the user interfaces with the UI 500.

The user may enter any remaining scanner data (e.g., serial number, manufacture date, etc.) manually from a visual inspection of information provided on the scanner 15. Alternatively, the host device 10 may look-up the remaining scanner data based on user input on the scanner identification screen 502 and/or the communication protocol identification screen 602. That is, the host device 10 may retrieve a stored profile of the scanner 15 stored on the database 25 or another device accessible over the network 30. If the stored profile of the scanner 15 is retrieved from the database 25, it may reflect current settings of the scanner 15. That is, if the settings of the scanner 15 were previously changed, the stored profile may reflect the most recent changes (and/or any changes previously made). If the stored profile is retrieved from the network 30, the stored profile may reflect manufacture default settings. That is, the stored profile may be retrieved from a manufacture server on the network 30.

Figure 7:
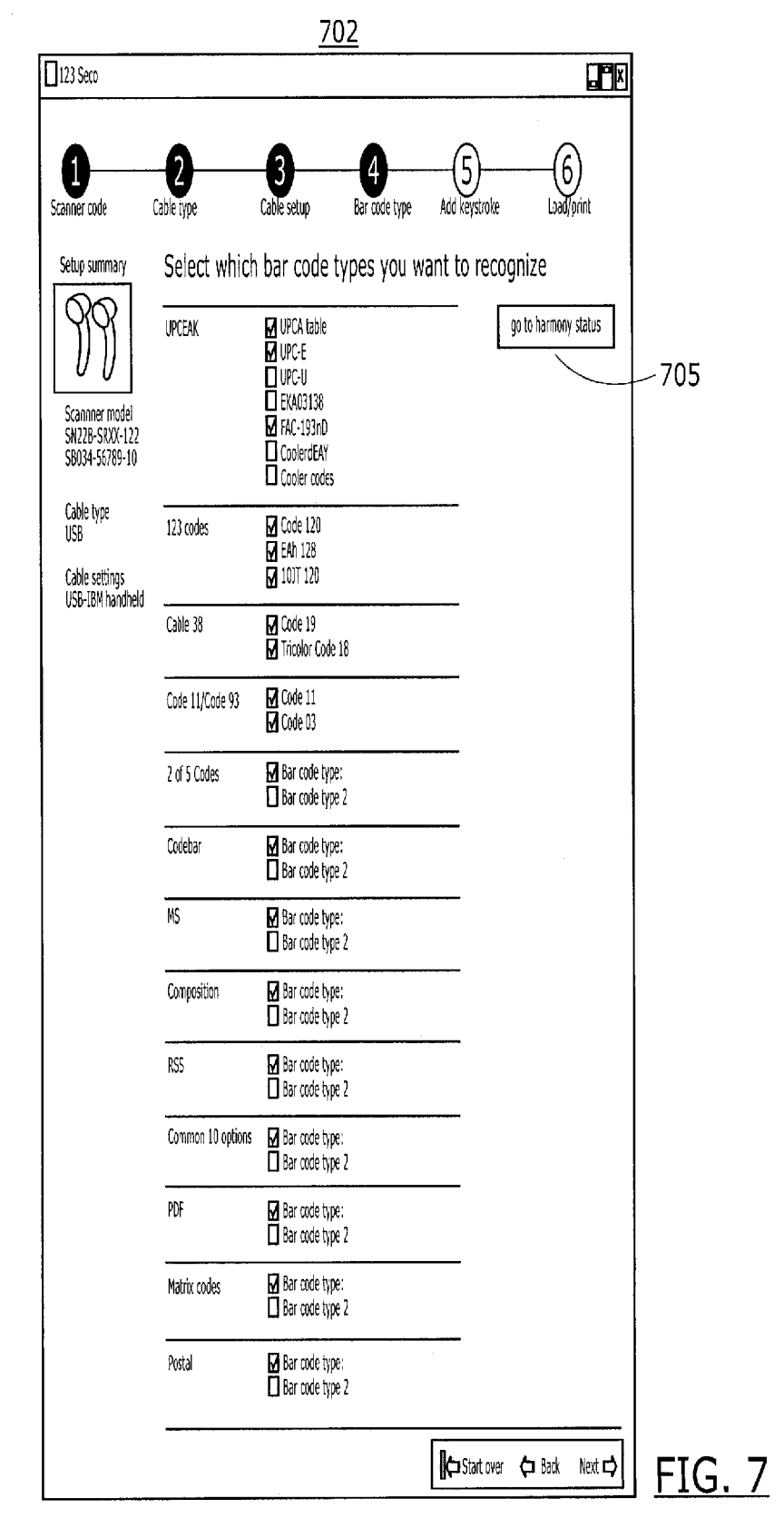

In step 220, the user may adjust the scanner data to reflect, for example, new settings, extended functionality, firmware updates, etc., generating adjusted scanner data for the scanner 15. For example, the scanner data may be adjusted when the scanner 15 is used for scanning additional symbologies. As shown in FIG. 7, the user may activate/de-activate recognition of bar code symbologies on a bar code recognition screen 702. The scanner data may also be reset to user-or manufacture-created default settings using a reset option 705. As noted above, the default settings may be retrieved from the database 25 and/or over the network 30.

Figure 8:
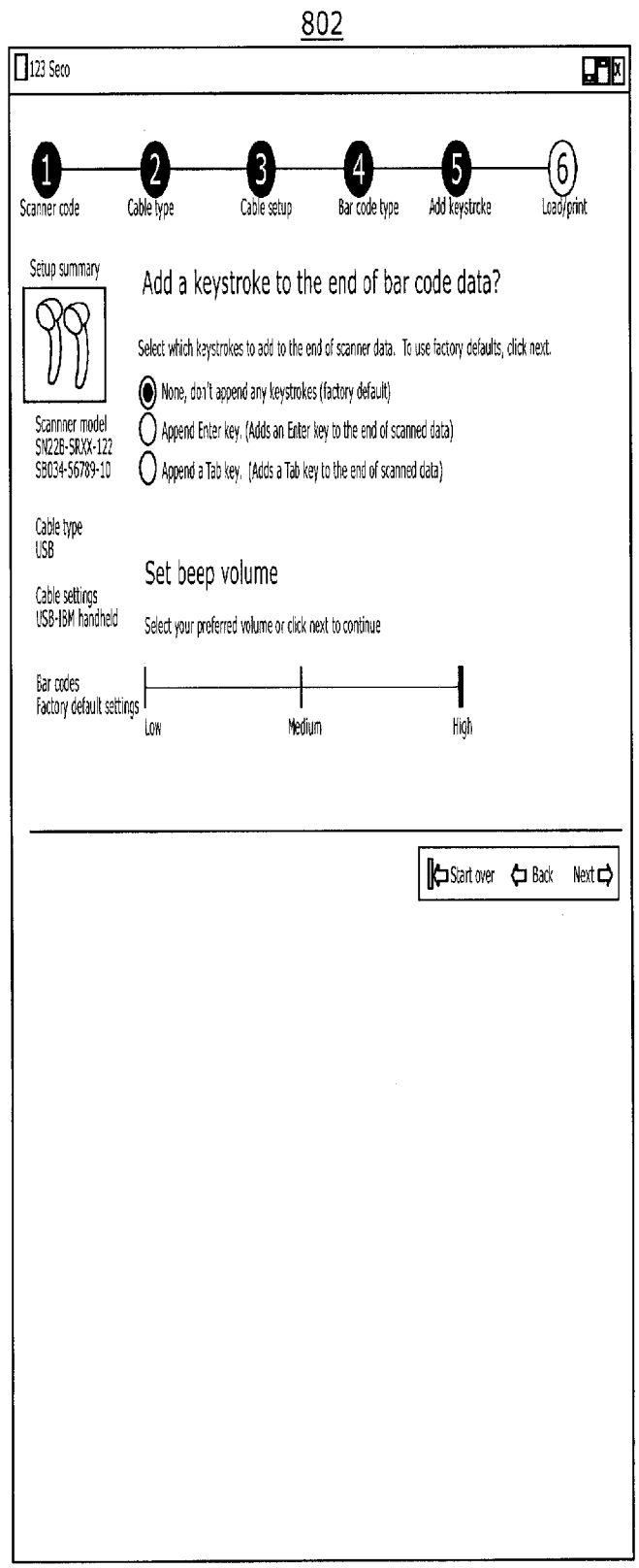
FIG. 8 shows an exemplary embodiment of an ADF screen of a user interface according to the present invention.

The user may also create or select pre-created advanced data formatting (ADF) rules to apply to the scanner 15, as shown in an ADF screen 802 in FIG. 8. For example, scan data generated by the scanner 15 when scanning a bar code may have a first predefined format. The user may instruct the scanner 15 to alter the first predefined format according to one or more ADF rules to generate a second predefined format prior to transmitting the scan data to a decoding device. The ADF screen 802 may also allow the user to adjust a beep volume, which may be indicative of a valid scan, incoming data, a VoIP call, etc.

Figure 9:
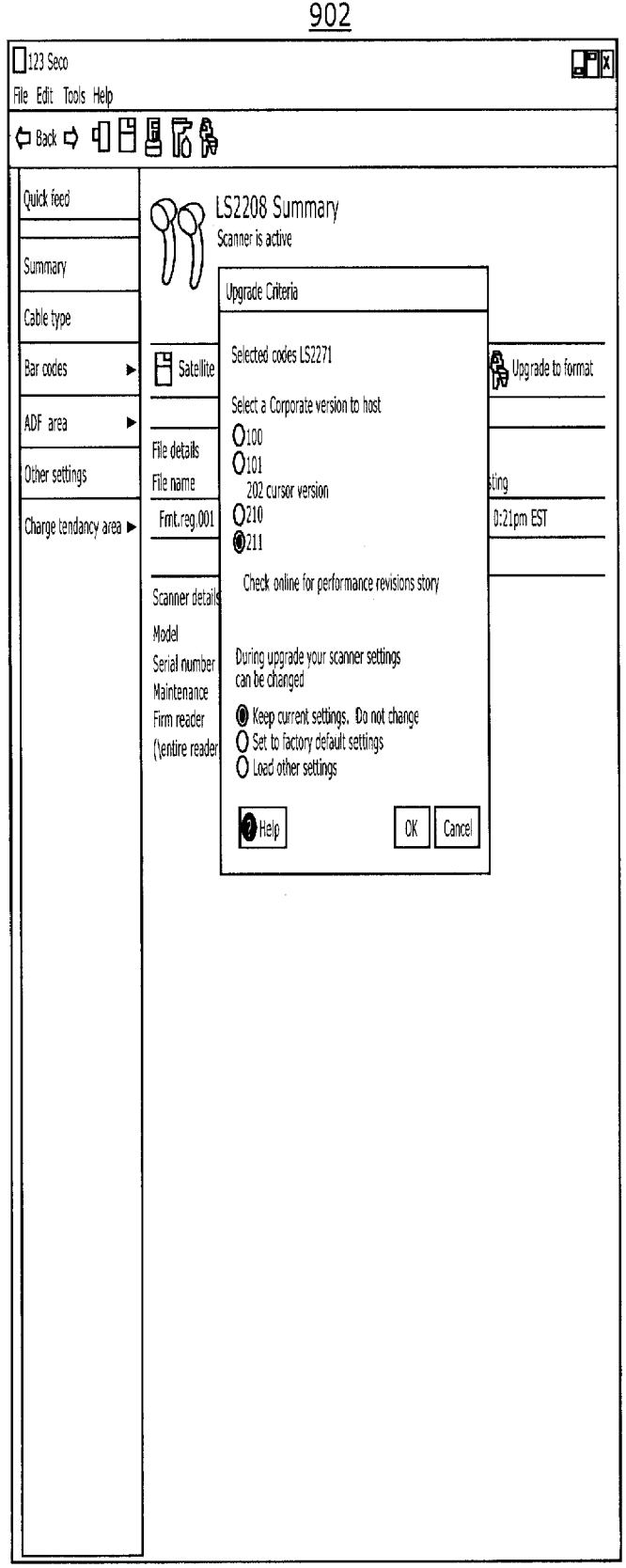
FIG. 9 shows an exemplary embodiment of a firmware upgrade screen of a user interface according to the present invention.
Figure 10:
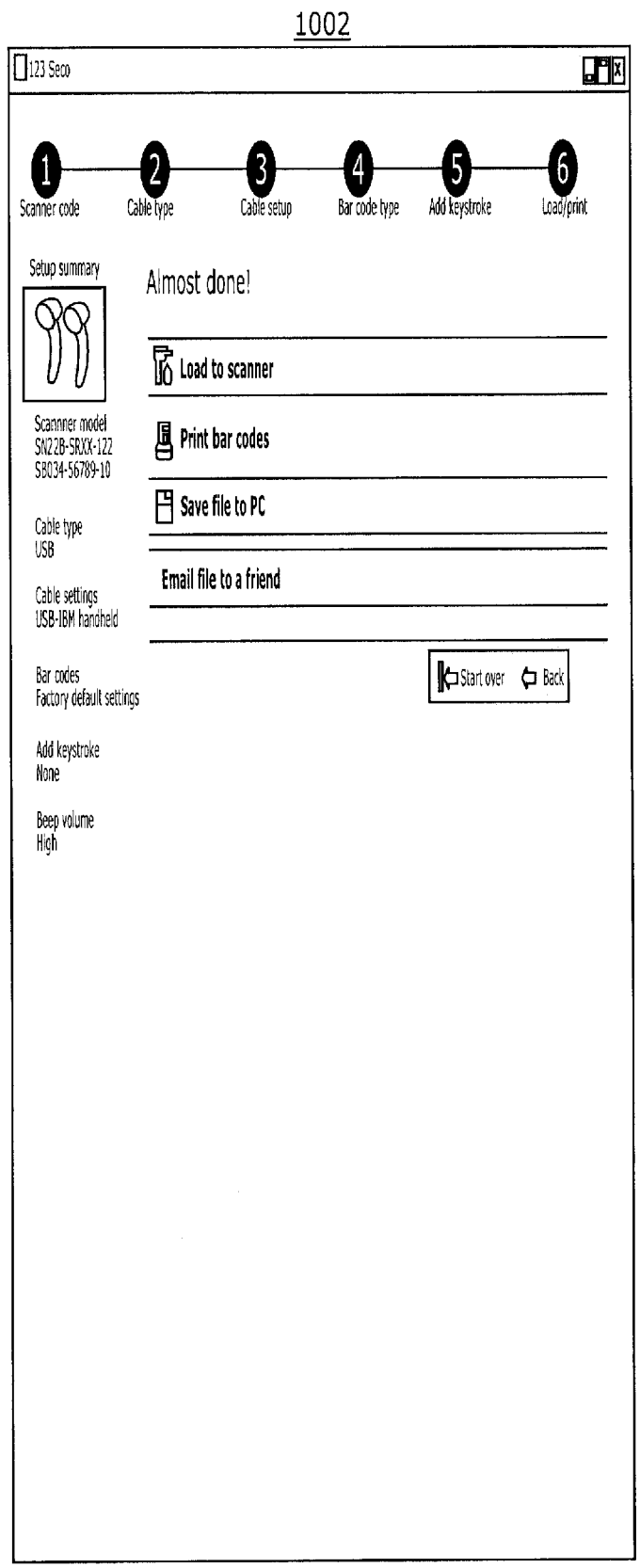
FIG. 10 shows an exemplary embodiment of a configuration download screen of a user interface according to the present invention.

The UI 500 may also allow the user to upgrade the firmware on the scanner 15. A firmware upgrade screen 902 shown in FIG. 9 presents the user with various options regarding the firmware. The user may select a firmware version from a plurality of firmware versions stored in the database 25 to install on the scanner 15. The user may also determine if a further firmware version(s) is available on the network 30. The firmware upgrade screen 902 may show each available firmware version (older and newer) and corresponding changes it made over an immediately prior version. For example, the firmware version 2.1.0 may have fixed certain bugs in the firmware version 2.0.2 which, as indicated in the firmware upgrade screen 902, is the current version of the firmware on the scanner 15.

Additional features may be provided to facilitate navigation of the configuration utility. As described above, the configuration utility may be used to configure multiple scanners simultaneously. For example, if the summary 300 displays profiles for a plurality of scanners, a filter may be used to sort the scanner data by field, setting, etc. A highlighter may be used to indicate an ongoing function or process for the scanner 15, e.g., downloading a newer firmware version. The configuration utility may also highlight any adjustment made to previous scanner data and/or default scanner data reflected in the current scanner data. In addition, the scanner data may be individually viewable by field. For example, a particular scanner configuration file may be opened and edited.

In step 225, the adjusted scanner data is applied to the scanner 15. When the scanner 15 is coupled to the host device 10 (directly or via the hub 20), the UI 500 may present a configuration download screen 1002 including a 'Load to Scanner' option which, when chosen by the user, downloads the adjusted scanner data directly to the scanner 15. When the host device 10 is interfacing with multiple scanners, the adjusted scanner data for all (or selected ones) of the scanners coupled to the host device 10 may be downloaded to the scanners in parallel. The scanner 15 may provide a visual and/or audible indicator (e.g., LED blink/color change, beep sequence, confirmation message on LCD, etc.) to confirm that the adjusted scanner data has been downloaded.

When the scanner 15 is not coupled to the host device 10, one or more bar codes representing the adjustments may be printed. When the bar codes are scanned, the scanner 15 reconfigures itself to reflect the adjusted scanner data. In addition, the adjusted scanner data may be written to a removable storage device (e.g., USB storage device, CD, DVD, floppy disk, etc.) and/or emailed to another host device which would be used to reconfigure the scanner 15. The email may contain a link for downloading the configuration file from a host and, optionally, include instructions on how to load the adjusted scanner data to the scanner 15.

After the adjusted scanner data is loaded to the scanner 15, the host device 10 may store the adjusted scanner data as a new profile for the scanner 15 in the database 25. Thus, when the scanner 15 is subsequently recoupled to host device 10 (or any device with access to the database 25), the new profile corresponding to the adjusted scanner data is retrieved.

Figure 4:
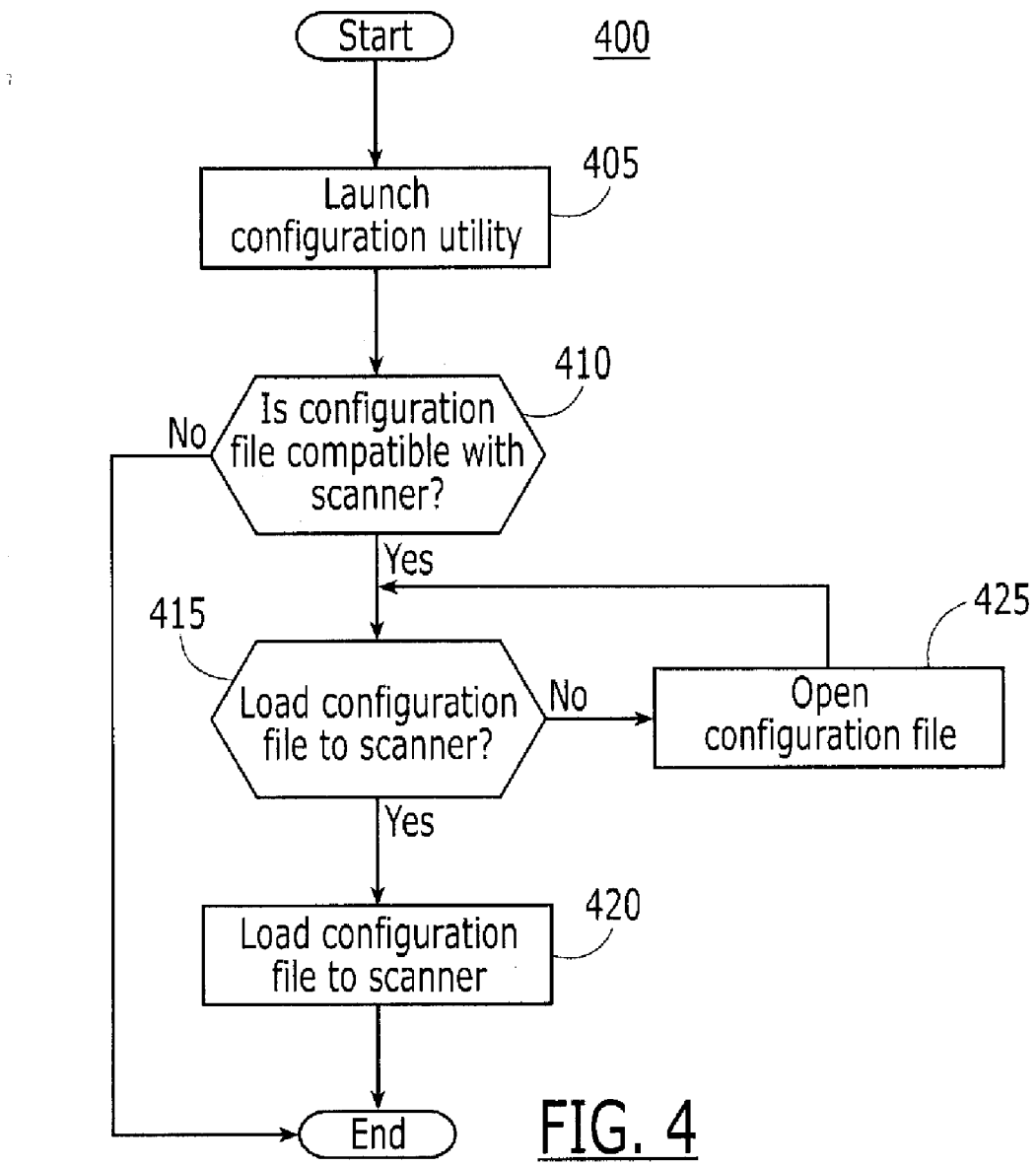
FIG. 4 shows an exemplary embodiment of a method for loading a configuration file to a computing device according to the present invention.

FIG. 4 shows an exemplary embodiment for loading a configuration file generated by the configuration utility according to the present invention. In step 405, the configuration utility is launched. In step 410, it is determined whether the configuration file (e.g., symbologies, volume of beep, etc.) is compatible with the scanner 15. For example, the configuration file may be coded for a particular model of scanner. In step 415, the configuration file is compatible with the scanner 15, so the user is prompted to load the configuration file directly to the scanner 15 or open the configuration file. When the scanner 15 is coupled to the host device 10, the configuration file may be loaded directly to the scanner 15 (step 420). However, when the scanner 15 is not coupled to the host device 10 and the user does not intend to open the configuration file, the user may select an option for printing bar codes corresponding to the configuration file. When the scanner 15 scans the bar codes, it reconfigures itself to settings corresponding to the configuration file. When the configuration file is opened, the user may edit it (step 425). When the editing is complete, the changes may be saved and the configuration file is loaded to the scanner 15 (or bar codes printed).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    detecting a coupling of a computing device to a host device;
    receiving first configuration data from the computing device if coupling is detected;
    if the computing device is not coupled to the host device, collecting information about the computing device from a user via a graphical user interface on a display of the host device;
    retrieving the first configuration data from a source different from the computing device based on the information;
    displaying the first configuration data on the graphical user interface on the display of the host device;
    generating second configuration data as a function of at least one change to the first configuration data entered via the graphical user interface;
    verifying the second configuration data is compatible with the computing device; and
    inputting the second configuration data to the computing device so that the computing device replaces the first configuration data with the second configuration data.

2. The method according to claim 1, further comprising:
    receiving an identifier corresponding to computing device; and
    retrieving the first configuration data from a database as a function of the identifier.

3. The method according to claim 1, wherein the computing device is one of a laser-based scanner, an imager-based scanner, an RFID reader, an RFID tag, a mobile phone, a PDA, a digital camera, a tablet, a network interface card and a laptop.

4. The method according to claim 1, wherein the first configuration data includes at least one of a model, a serial number, a manufacture data, a firmware version, an advanced data formatting rule, a beep volume, a recognized symbology and a communication protocol.

5. The method according to claim 1, wherein the inputting includes:
    downloading the second configuration data to the computing device.

6. The method according to claim 1, wherein the inputting includes:
    printing the second configuration data as indicia readable by the computing device.

7. The method according to claim 1, further comprising:
    storing the second configuration data in a database.

8. A system, comprising:
    a host device having a display displaying a graphical user interface;
    a computing device supplying first configuration data to the host device when the computing device is coupled to the host device, the first configuration data being displayed on the graphical user interface,
    wherein when the computing device is not coupled to the host device, the host device receives information about the computing device from a user via the graphical user interface, retrieves the first configuration data from a source different from the computing device based on the information and displays the first configuration data on the graphical user interface,
    wherein the host device generates second configuration data as a function of at least one change to the first configuration data entered via the graphical user interface,
    wherein the host device verifies the second configuration data is compatible with the computing device, and
    wherein the second configuration data is input to the computing device so that the computing device replaces the first configuration data with the second configuration data.

9. The system according to claim 8, wherein the computing device supplies an identifier to the host device, and the host device retrieves the first configuration data from a database as a function of the identifier.

10. The system according to claim 8, wherein the computing device is one of a laser-based scanner, an imager-based scanner, an RFID reader, an RFID tag, a mobile phone, a PDA, a digital camera, a tablet, a network interface card and a laptop.

11. The system according to claim 8, wherein the host device is one of a PC and a laptop.

12. The system according to claim 8, wherein the first configuration data includes at least one of a model, a serial number, a manufacture data, a firmware version, an advanced data formatting rule, a beep volume, a recognized symbology and a communication protocol.

13. The system according to claim 8, wherein the host device downloads the second configuration data to the computing device.

14. The system according to claim 8, wherein the host device prints the second configuration data as indicia readable by the computing device.

15. The method according to claim 8, wherein the host device stores the second configuration data in a database.

16. A computer-readable storage medium storing a set of instructions, the set of instructions capable of being executed by a processor, the set of instructions performing the steps of:
   detecting a coupling of a computing device to a host device;
   obtaining first configuration data from the computing device if coupling is detected;
   if the computing device is not coupled to the host device, collecting information about the computing device from a user via a graphical user interface on a display of the host device;
   retrieving the first configuration data from a source different from the computing device based on the information;
   displaying the first configuration data on the graphical user interface on the display of the host device;
   generating second configuration data as a function of at least one change to the first configuration data entered via the graphical user interface;
   verifying the second configuration data is compatible with the computing device; and
   inputting the second configuration data to the computing device so that the computing device replaces the first configuration data with the second configuration data.

17. The computer-readable storage medium according to claim 16, Wherein the set of instructions further performs the steps of:
   obtaining an identifier corresponding to computing device; and
   retrieving the first configuration data from a database as a function of the identifier.

18. The computer-readable storage medium according to claim 16, wherein the computing device is one of a laser-based scanner, an imager-based scanner, an RFID reader, an RFID tag, a mobile phone, a PDA, a digital camera, a tablet, a network interface card and a laptop.

19. The computer-readable storage medium according to claim 16, wherein the first configuration data includes at least one of a model, a serial number, a manufacture data, a firmware version, an advanced data formatting rule, a beep volume, a recognized symbology and a communication protocol.

20. The computer-readable storage medium according to claim 16, wherein the inputting step includes:
   downloading the second configuration data to the computing device.

21. The computer-readable storage medium according to claim 16, wherein the inputting step includes:
   printing the second configuration data as indicia readable by the computing device.

22. The computer-readable storage medium according to claim 16, wherein the inputting step includes:
   storing the second configuration data in a database.

23. A device, comprising:
   a processing means detecting a coupling of a computing device to a host device, the processing means receiving first configuration data from the computing device when the computing device is coupled to the host device;
   a display means displaying the first configuration data on a graphical user interface, wherein the processing means generates second configuration data as a function of at least one change to the first configuration data entered via the graphical user interface,
   wherein when the computing device is not coupled to the processing means, the processing means receives information about the computing device from a user via the graphical user interface, retrieves the first configration data from a source different from the computing device based on the information and displays the first configuration data on the graphical user interface of the display means,
   wherein the processing means verifies the second configuration data is compatible with the computing device, and
   wherein the processing means inputs the second configuration data to the computing device so that the computing device replaces the first configuration data with the second configuration data.

* * * * *